(12) United States Patent
Ray et al.

(10) Patent No.: US 9,106,519 B1
(45) Date of Patent: Aug. 11, 2015

(54) WIRELESS COMMUNICATION SYSTEM FOR DETERMINING USER EQUIPMENT QUALITY OF SERVICE

(71) Applicant: Sprint Communications Company L.P., Overland Park, KS (US)

(72) Inventors: Amar Nath Ray, Shawnee, KS (US); Joao Carlos Osorio Gouvea Teixeira de Magalhaes, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 52 days.

(21) Appl. No.: 14/137,317

(22) Filed: Dec. 20, 2013

(51) Int. Cl.
*H04W 24/00* (2009.01)
*H04L 12/26* (2006.01)
*H04B 7/00* (2006.01)

(52) U.S. Cl.
CPC ............. *H04L 43/062* (2013.01); *H04W 24/00* (2013.01)

(58) Field of Classification Search
CPC ................................ H04W 4/02; H04W 64/00
USPC .............................................. 455/414.2, 456.3
See application file for complete search history.

(56) References Cited

U.S. PATENT DOCUMENTS

| | | | |
|---|---|---|---|
| 7,672,675 B2 | 3/2010 | Pande et al. | |
| 8,000,723 B2 | 8/2011 | Pande et al. | |
| 2013/0045759 A1 | 2/2013 | Smith | |
| 2013/0051239 A1* | 2/2013 | Meredith et al. | 370/241 |
| 2013/0166731 A1* | 6/2013 | Yamanaka et al. | 709/224 |

* cited by examiner

*Primary Examiner* — Lee Nguyen (57) ABSTRACT

A wireless communication network estimates User Equipment (UE) Quality of Service (QoS). The wireless communication network processes a signal strength metric measured by the UE to select an RF coverage module. The wireless communication network process the selected RF coverage module to determine an RF coverage score. The RF coverage score represents the amount of overlapping RF coverage. The wireless communication network processes the RF coverage score to select an application module. The wireless communication network processes the application module to identify a service module. The wireless communication network processes the service module based on RF parameters measured by the UE to estimate a QoS for the UE. The wireless communication network transfers the estimated QoS to the UE.

20 Claims, 7 Drawing Sheets

| RF COVERAGE SCORE | RECEIVED SIGNAL STRENGTH | LATENCY | SIGNAL TO NOISE RATIO | RF NOISE | APPLICATION | SERVICE | QoS |
|---|---|---|---|---|---|---|---|
| 1 | S1 | L1 | SNR1 | R1 | A1 | S1 | Q1 |
| 2 | S2 | L2 | SNR2 | R2 | A2 | S2 | Q2 |
| 3 | S3 | L3 | SNR3 | R3 | A3 | S3 | Q3 |
| 1 | S1 | L4 | SNR4 | R4 | A4 | S4 | Q4 |
| 3 | S3 | L5 | SNR5 | R5 | A5 | S5 | Q5 |

QUALITY OF SERVICE LOOKUP TABLE 500

WIRELESS COMMUNICATION SYSTEM FOR DETERMINING USER EQUIPMENT QUALITY OF SERVICE

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication systems, such as cellular voice and data networks, typically include multiple wireless access nodes spread over a geographic area through which wireless communication devices can register and receive wireless access to wireless communication services. In many examples, the wireless communication devices are mobile, and can move between wireless coverage areas, such as sectors, of the wireless access nodes. In some geographic areas, coverage areas overlap.

With the advances in mobile technology, wireless communication devices continue to advance in available services. Data services such as media streaming, Internet browsing, or gaming require more bandwidth than services, such as text messaging and voice calls. Quality of Service (QoS) may be affected by Radio Frequency (RF) parameters, such as signal strength, latency, signal to noise ratio, and RF noise. RF parameters may vary over the coverage area.

Overview

A wireless communication network estimates User Equipment (UE) Quality of Service (QoS). The wireless communication network processes a signal strength metric measured by the UE to select an RF coverage module. The wireless communication network process the selected RF coverage module to determine an RF coverage score. The RF coverage score represents the amount of overlapping RF coverage. The wireless communication network processes the RF coverage score to select an application module. The wireless communication network processes the application module to identify a service module. The wireless communication network processes the service module based on RF parameters measured by the UE to estimate a QoS for the UE. The wireless communication network transfers the estimated QoS to the UE.

DETAILED DESCRIPTION

Figure 1A:
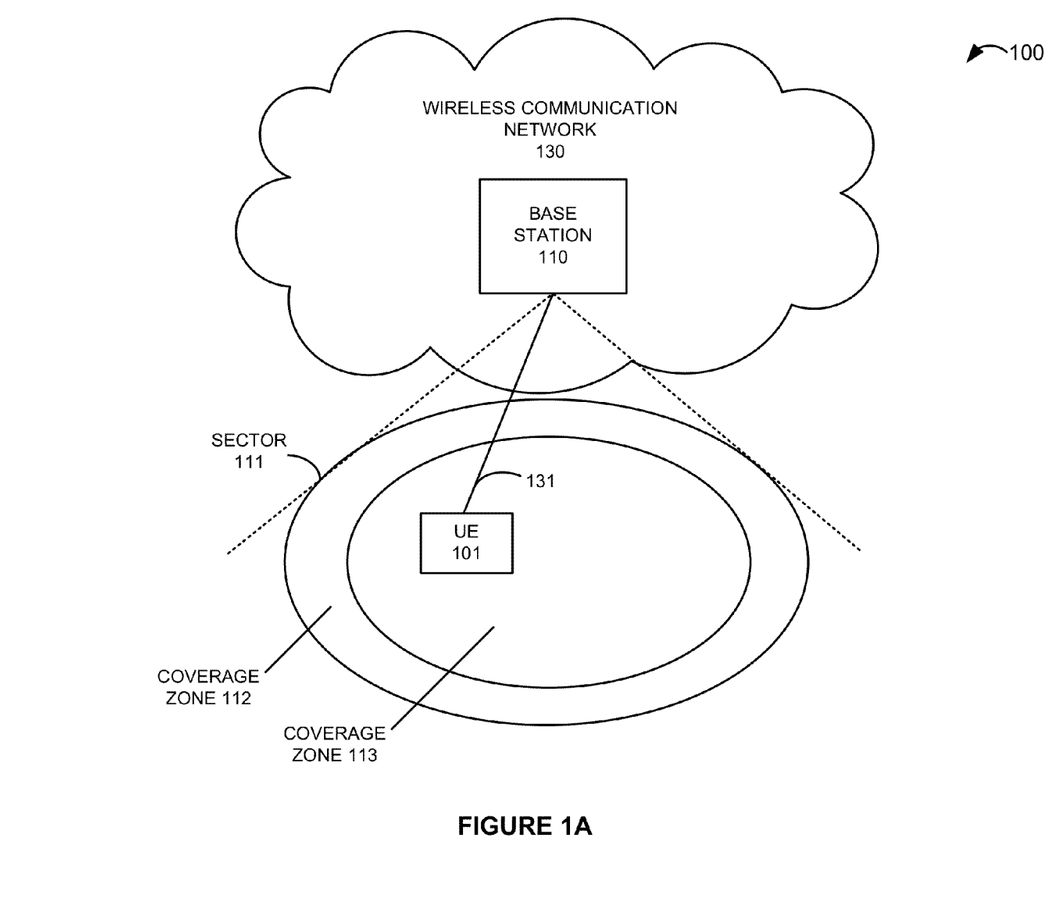
FIGS. 1A and 1B illustrate a wireless communication system for determining UE QoS.

FIG. 1A illustrates wireless communication system 100. Wireless communication system 100 includes user equipment (UE) 101 and wireless communication network 130. Wireless communication network 130 includes base station 110. Base station 110 provides wireless access to wireless communication network 130 in sector 111. Sector 111 includes coverage zone 112 and 113. UE 101 and base station 110 communicate over wireless link 131. Examples of UE 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof.

Figure 1B:
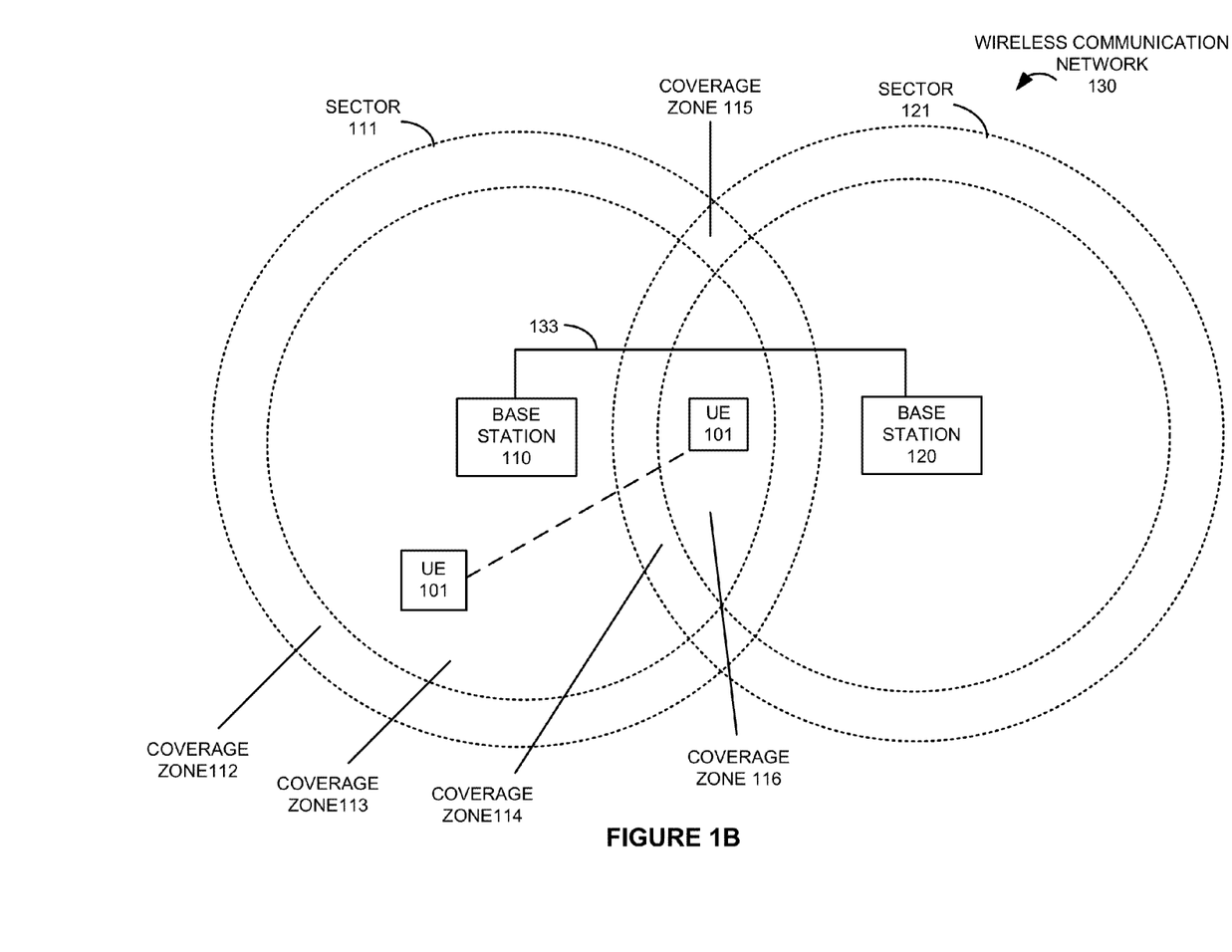

FIG. 1B provides a more detailed illustration of wireless communication network 130 that includes base stations 110 and 120 and UE 101. Base station 110 and base station 120 communicate over communication link 133. Base station 110 provides wireless access to wireless communication network 130 in sector 111. Base station 120 provides wireless access to wireless communication network 130 in sector 121. Although not required, sector 111 and 121 are shown as overlapping. Sectors 111 and 121 include coverage zones 112-116.

In operation, wireless communication network 130 estimates a QoS for UE 101. Wireless communication network 130 processes a signal strength metric measured by UE 101 to select an RF coverage module. The RF coverage module selected may be based on measured signal strength. Examples of RF coverage modules include weak, normal, and strong. In some instances, the location of UE 101 may also be considered in selecting the RF coverage module. The location of UE 101 may be geographic coordinates and/or base station cell/sector information, among other location indicators—including combinations thereof. The location of UE 101 may be determined by sensory or monitoring equipment, such as a Global Positioning System (GPS) or the like, of user equipment 101.

Wireless communication network 130 processes the selected RF coverage module to determine an RF coverage score. The RF coverage score represents the amount of overlapping RF coverage. For example, in FIG. 1B, each coverage zone 112-116 is given a numerical value: coverage zone 112=1; coverage zone 113=1; coverage zone 114=2; coverage zone 115=2; and coverage zone 116=2. Coverage zones 112 and 113 have a numerical value of 1 because there is coverage from only sector 111. Coverage zones 114-116 have a numerical value of 2 because there is coverage from sectors 111 and 121. These numerical values are for illustrative purposes and may not reflect the actual numerical values given to the coverage zones. So when UE 101 is located in coverage zone 113 the RF coverage score would be 1 or the numerical value given to coverage zone 113. As UE 101 moves through wireless communication network 130, and enters coverage zone 116, the RF coverage score would change to 2, the numerical value given to coverage zone 116.

In other examples, the wireless communication protocol may also be considered in determining the numerical values of the coverage zones. For example, base station 110 is operating on a 4G network and base station 120 is operating on a 3G network. Then sector 111 may be given a numerical value of 2, while sector 121 is given a value of 1. The numerical values of the coverage zones may be further affected by the location within the sector. For instance, the edges of a sector may have lower numerical values than the center of the sector. Therefore, the edge of sector 111 may have a score of 0.5 and the edge of sector 121 may have a numerical value of 1.5. The RF coverage score would then be determined by summing the numerical values given to each sector. For example, coverage zone 113, located in the center of sector 111=1 and there is no overlapping coverage so the RF coverage score=1. In coverage zone 116, sector 111=1 and sector 121=2, so the RF coverage score=3.

Wireless communication network 130 processes the RF coverage score to select an application module. In some examples, the application module classifies applications based on the type of data sent and/or received. In other examples, the application module may classify applications based on a numerical value indicating the amount of network resources consumed. Examples of the application modules may include text, voice, video, and data. Application modules may also be classified as peer-to-peer (i.e. a voice or video call) or one-way (i.e. downloads). Application modules may be used to sort application such as messaging, telephone, email, Internet browsing (i.e. Internet Explorer or Safari), social media applications (i.e. Facebook, Instagram, and Twitter), Skype, Netflix, and/or other applications located on UE 101. Wireless communication network 130 processes the application module to identify a service module.

Wireless communication network 130 processes the service module based on RF parameters measured by UE 101 to estimate a QoS for UE 101. Examples of service types include high QoS customers, low QoS customers, subscribers with an unlimited data plan, and/or classifying users based on the amount of data used. Examples of RF parameters include signal strength, latency, signal to noise ratio, and/or RF noise—including combinations thereof. Wireless communication network 130 transfers the estimated QoS to UE 101. Examples of the estimated QoS include a determination of the level or quality of UE 101's connectivity to wireless communication network 130. In some examples, the estimated QoS may be a numerical value. In other examples, the estimated QoS may indicate the type of applications that would perform well given the connectivity to wireless communication network 130. For example, in low connectivity areas, services, such as media streaming, Internet browsing, and/or gaming, may not perform as well as services, such as text messaging and voice calls.

Figure 2:
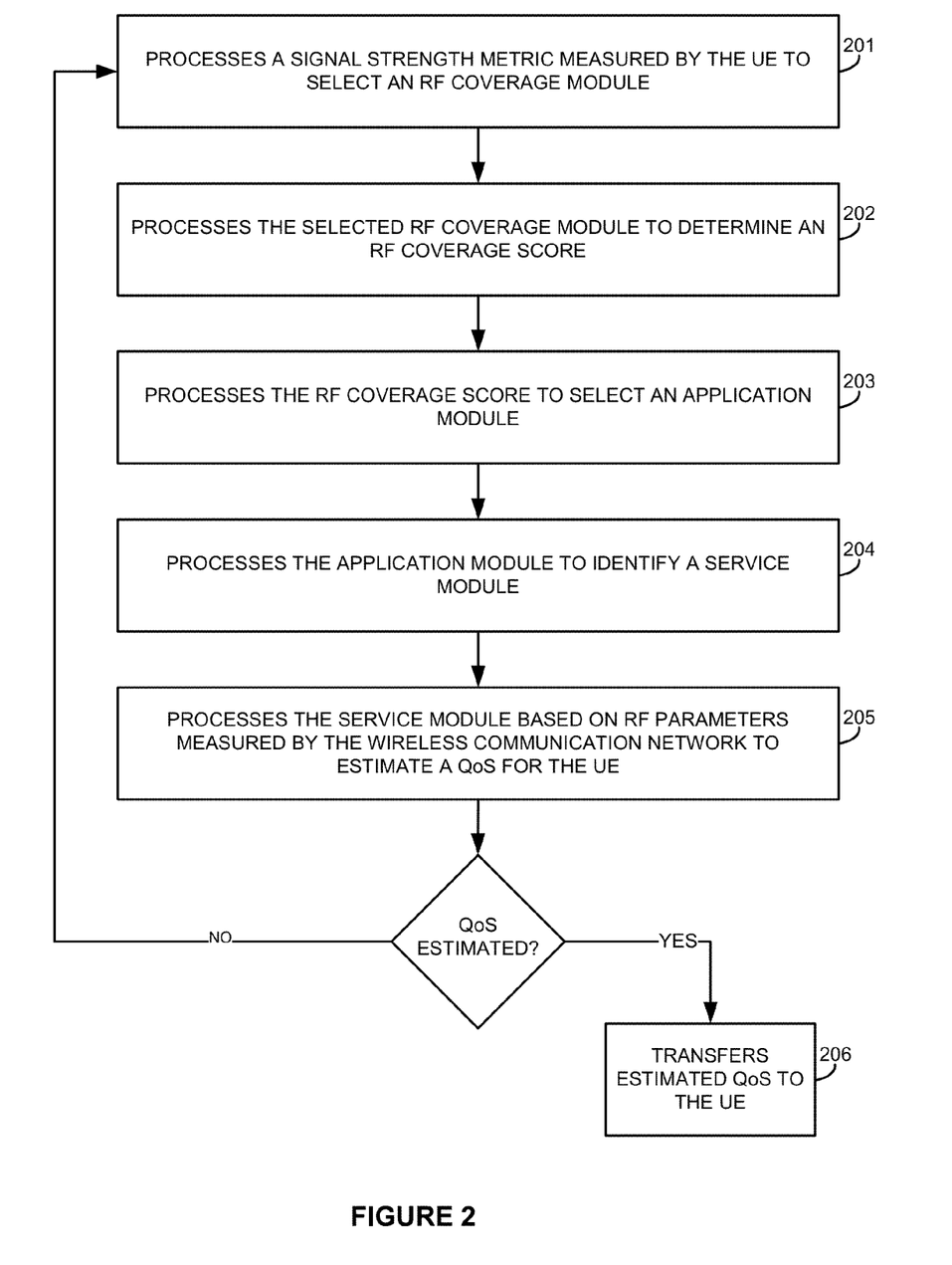
FIG. 2 illustrates the operation of the wireless communication system for determining UE QoS.

FIG. 2 illustrates the operation of wireless communication system 100 for determining UE QoS. UE 101 measures a signal strength metric to be transferred for delivery to wireless communication network 130. In some examples, the signal strength is measured by another entity in wireless communication network 130, such as base stations 110 or 120. The signal strength metric may measure the downlink and/or uplink signal strength. Wireless communication network 130 processes the signal strength metric to select an RF coverage module (201).

Wireless communication network 130 processes the selected RF coverage module to determine an RF coverage score (202). Wireless communication network 130 processes the RF coverage score to select an application module (203). Wireless communication network 130 processes the selected application module to identify a service module (204). Wireless communication network 130 processes the service module based on RF parameters measured by wireless communication network 130 to estimate a Quality of Service (QoS) for UE 101 (205). In some examples, some or all of the RF parameters may be measured by UE 101. Wireless communication network 130 transfers the estimated QoS to UE 101 (206).

Figure 3:
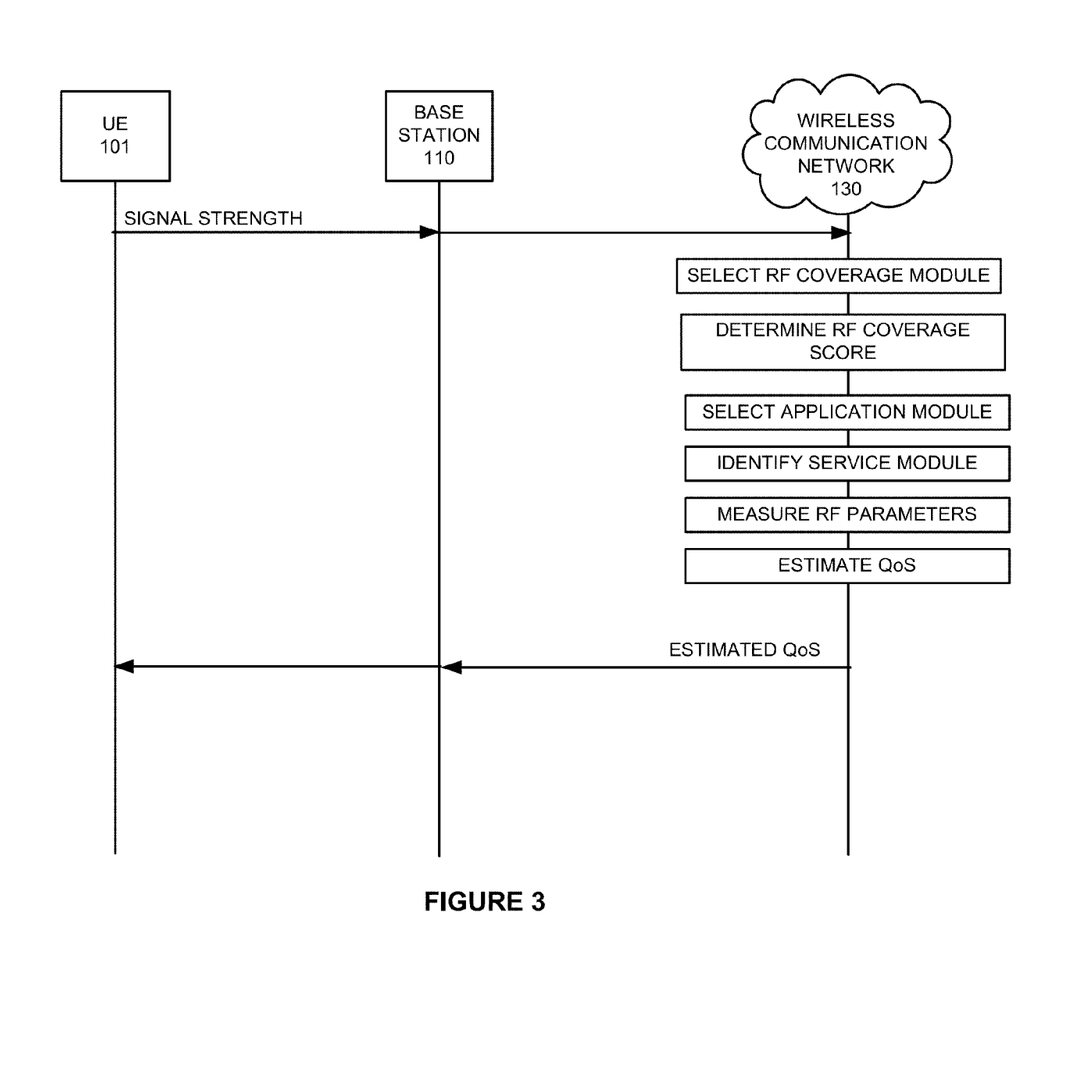
FIG. 3 illustrates the operation of the wireless communication system for determining UE QoS.

FIG. 3 illustrates the operation of wireless communication system 100 for determining UE QoS. UE 101 measures a signal strength metric and transfers the signal strength metric to wireless communication network 130. Wireless communication network 130 processes the signal strength metric to select a RF coverage module. Wireless communication network 130 process the selected RF coverage module to determine an RF coverage score. Wireless communication network 130 processes the RF coverage score to select an application module. Wireless communication network 130 processes the application module to identify a service module. Wireless communication network 130 processes the service module based on RF parameters measured by UE 101 to estimate a QoS for UE 101. Wireless communication network 130 transfers the estimated QoS to UE 101.

In some examples, UE 101 uses the transferred QoS to control and/or schedule push/pull notifications. For instance, when the QoS is high, UE 101 may trigger upload bursting. In other examples, when QoS is low, UE 101 may limit unnecessary up/downloads until QoS is higher. UE 101 may also inform the operating system and/or applications on UE 101 of the transferred QoS. In some examples, UE 101 may also inform the user of the transferred QoS. For instance, when the transferred QoS is low, UE 101 may inform the user of the low QoS and suggest connecting through another available access point, for example a WIFI hotspot. In other examples, when QoS is low, UE 101 may inform the user that high bandwidth applications such as video may be perform poorly or be limited. UE 101 may then inform user when QoS is high enough to run the requested application. UE 101 may also store QoS information based on location for future use when UE 101 is in the same location.

Figure 4:
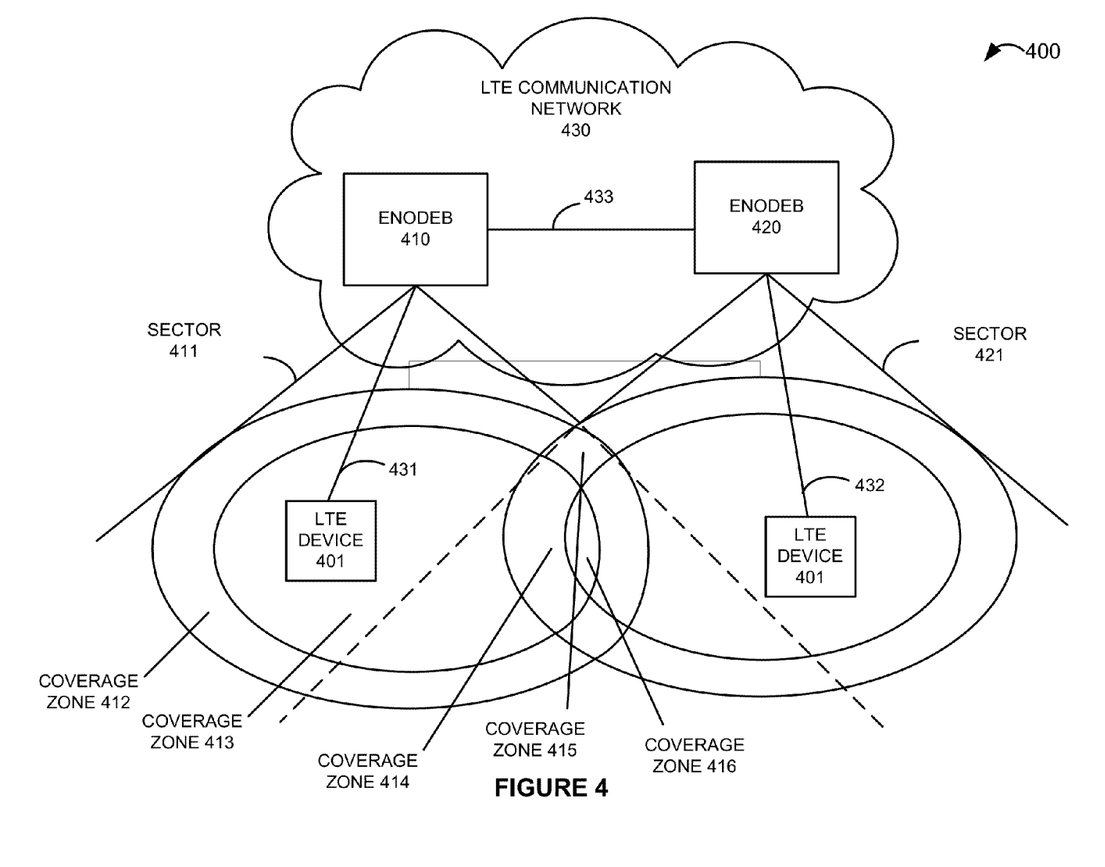
FIG. 4 illustrates an example of wireless communication system for determining UE QoS.

FIG. 4 illustrates wireless communication system 400 for determining UE QoS. Wireless communication system 400 is an example of wireless communication system 100, although wireless communication system 100 may use alternative configurations. Wireless communication system 400 includes LTE device 401 and LTE communication network 430. LTE device 401 is an example of UE 101, although UE 101 may use alternative configurations. LTE communication network 430 is an example of wireless communication network 130, although wireless communication network 130 may use alternative configurations.

LTE communication network 430 includes eNodeBs 410 and 420. eNodeB 410 provides wireless communication service to LTE communication network 430 over sector 411. eNodeB 420 provides wireless communication service to LTE communication network 430 over sector 421. LTE device 401 communicates with eNodeB 410 over communication link 431. LTE device 401 communicates with eNodeB 420 over communication link 432. eNodeB 410 and eNodeB 420 communicate over communication link 433. Sectors 411 and 412 create coverage zones 412-416.

In operation, LTE communication network 430 estimates a QoS for LTE device 401. LTE communication network 430 processes a signal strength metric measured by LTE device 401 to select an RF coverage module. For example, LTE device 101 measures a strong pilot signal from eNodeB 410 and selects the strong RF coverage module. In this case, because the signal strength is strong, the lack of overlapping coverage may not have as much of an impact of the QoS as it would in situations where the measured signal strength is weak.

As shown in FIG. 4, LTE device 401 is initially located in coverage zone 413. LTE communication network 430 processes the selected RF coverage module to determine an RF coverage score. In some examples, the network provider may be considered in determining an RF coverage score. For instance, eNodeB 410 may be owned by one network provider and eNobdB 420 may be owned by a different network provider. In this example, eNodeB 410 is operating on a 4G network. Therefore, LTE device 401, located in coverage zone 413, would have an RF coverage score calculated based on the numerical value given to a sector with LTE/4G service. Since there is no overlapping coverage, the RF coverage score is simply the numerical value given to LTE/4G service. The RF coverage score for LTE device 401 may change as LTE device 401 travels between sectors. For example, as LTE device 401 moves from coverage zone 413 to coverage zone 416, the RF coverage score changes, since coverage zone 416 has overlapping coverage from sectors 411 and 421.

LTE communication network 430 processes the RF coverage score to select an application module. Examples of application modules include audio, video, or data. Examples of audio applications include music streaming and a VoIP call. Examples of video applications include video call or video downloading. Examples of data applications include media streaming, Internet browsing, and gaming. Alternatively, applications can be classified as analog or digital. LTE communication network 430 processes the application module to identify a service module. LTE communication network 430 processes the service module based on RF parameters measured by LTE device 401 to estimate a QoS for LTE device 401. Examples of RF parameters include signal strength, latency, signal to noise ratio, and/or RF noise—including combinations thereof.

LTE communication network 430 transfers the estimated QoS to LTE device 401. Examples of the estimated QoS include a determination of the level or quality of LTE 401's connectivity to LTE communication network 430. In some occurrences, the estimated QoS may be a numerical value. In other examples, the estimated QoS may indicate the type of applications that would perform well, given the connectivity to LTE communication network 430. For example, in low connectivity areas, services, such as media streaming, Internet browsing, and/or gaming may not perform as well as services, such as text messaging and voice calls.

Figure 5:
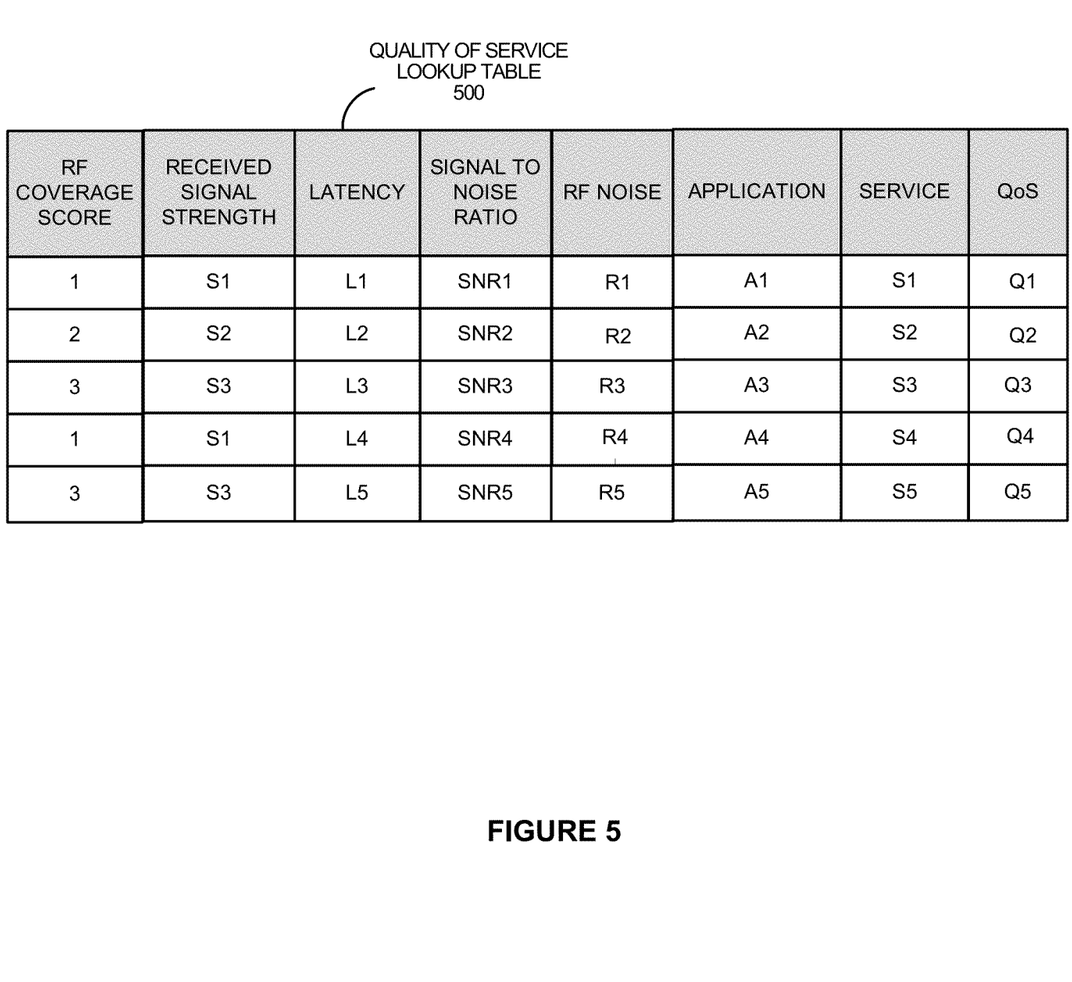
FIG. 5 illustrates an example of a data structure for determining UE QoS.

FIG. 5 illustrates an example of a data structure for determining user equipment quality of service. Quality of Service lookup table 500 includes a first column indicating an RF coverage score, a second column indicating a received signal strength value, a third column indicating a latency value, a fourth column indicating a signal to noise ratio, a fifth column indicating a RF noise value, a sixth column indicating application classification, a seventh column indicating a service classification, and an eighth column indicating a QoS value. Although, not shown, other wireless communication network data, such as network provider, network type (home or roaming), location, and/or wireless protocol may also be considered in determining UE QoS. The values used in the FIG. 5 are for illustrative purposes and may not reflect actual values.

For example, a user operating a UE in given coverage zone and/or sector, may measure a signal strength of S1. Using the signal strength S1, RF coverage module R1 is selected. In one example, the user of the UE may be running high data applications and have a high QoS. Based on the application module and service module selected, in addition to the other RF parameters, the estimated QoS for the UE is Q1. In another example, the user of the UE may be running low data applications and have a low QoS. Based on the application module and service module selected, in addition to the other RF parameters, the estimated QoS for the UE is Q5.

Figure 6:
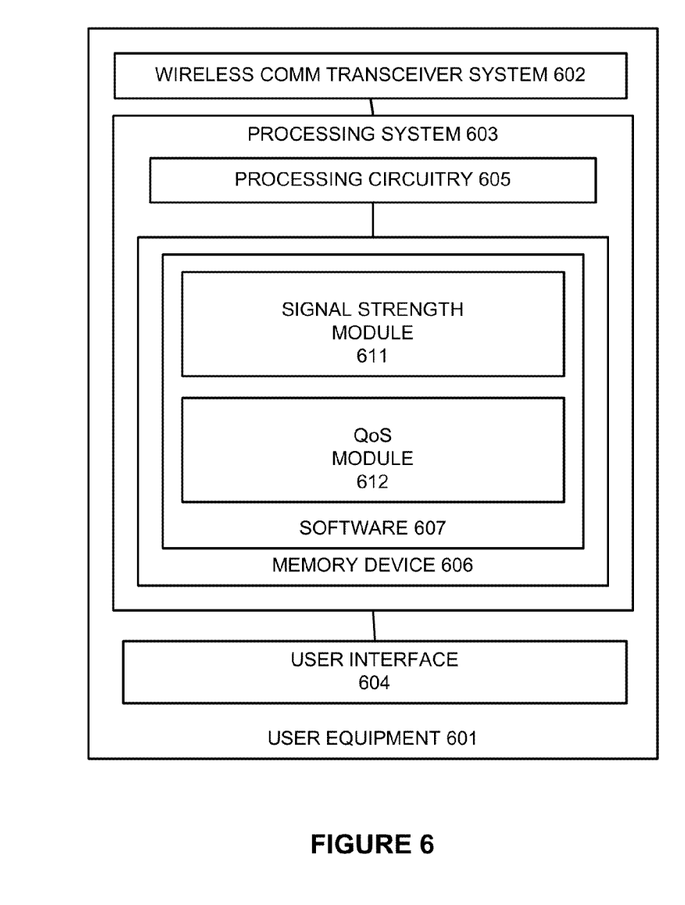
FIG. 6 illustrates an example of a UE.

FIG. 6 illustrates user equipment 601. User equipment (UE) 601 is an example of UE 101 and LTE device 401, although UE 101 and LTE device 401 could use alternative configurations. UE 601 comprises wireless communication transceiver system 602, processing system 603, and user interface 604. Processing system 603 is linked to wireless communication transceiver system 602 and user interface 604. Processing system 603 includes processing circuitry 605 and memory device 606 that stores operating software 607. UE 601 may include other well-known components such as a battery and enclosure that are not shown for clarity. UE 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various protocols, such as CDMA, EVDO, WIMAX, GSM, LTE, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606, portions of wireless communication transceiver system 602, and user interface 604. Operating software 607 comprises computer programs, firmware, or some other forms of machine-readable processing instructions. Operating software 607 may include an operating system, utilities, drivers, network interfaces, applications, or some other type of software. When executed by processing circuitry 605, software 607 directs processing system 603 to operate as described herein to determine UE QoS. In particular, signal strength module 611 directs processing system 603 to measure and transfer the signal strength metric. QoS module 612 directs processing system 603 to run the applications located on wireless communication device 601 based on the estimated QoS received from the wireless communication network.

Figure 7:
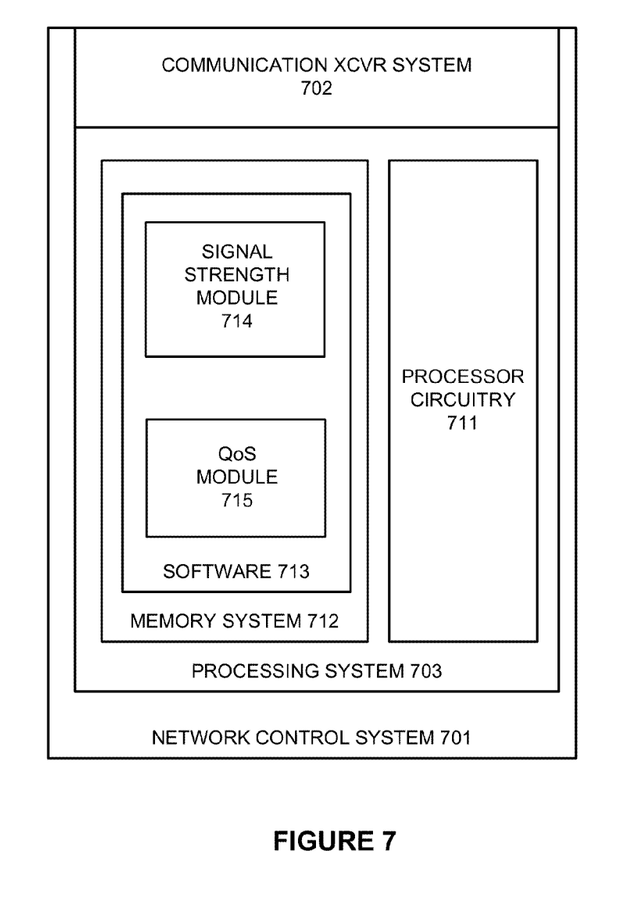
FIG. 7 illustrates an example of a network control system.

FIG. 7 illustrates network control system 701 for determining UE QoS. Network control system 701 may be an entity in wireless communication networks 130 or 430, base stations 110 and 120, eNodeBs 410 and 420, and/or may be distributed across various network elements. Although shown as a single entity, network control system 701 may comprise multiple components and may use alternative configurations and operations. Network control system 701 comprises communication transceiver system 702 and processing system 703. Processing system 703 includes processing circuitry 711 and memory 712 that stores software 713. Software 713 comprises software modules 514-515.

Communication transceiver system 702 comprises components that communicate over communication links such as network cards, ports, RF transceivers, processing circuitry and software, or some other communication components. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof. Communication transceiver system 702 receives a signal strength metric from a UE. Communication transceiver system 702 transfers an estimated QoS to the UE.

Processor circuitry 711 comprises microprocessor and other circuitry that retrieves and executes operating software 713 from memory system 712. Processor circuitry 711 may comprise a single device or could be distributed across multiple devices—including devices in different geographic areas. Processor circuitry 711 may be embedded in various types of equipment. Examples of processor circuitry 711 include central processing units, application specific processors, logic devices, and/or any type of computer processing devices—including combinations thereof. Processor circuitry 711 determines UE QoS.

Memory system 712 comprises a non-transitory computer readable storage medium readable by processing system 703 and capable of storing software 713, such as a disk drive, flash drive, data storage circuitry, or some other hardware memory apparatus—including combinations thereof. Memory system 712 can include volatile and non-volatile, removable and non-removable media implemented in any method or technology for storage of information, such as computer readable instructions, data structures, program modules, or other data—including combinations thereof. Memory system 712 may comprise a single device or could be distributed across multiple devices—including devices in different geographic areas. Memory system 712 may be embedded in various types of equipment. In some examples, a computer apparatus could comprise memory system 712 and software 713.

Software 713 comprises computer programs, firmware, or some other form of machine-readable processing instructions. Software 713 may include an operating system, utilities, drivers, network interfaces, applications, or some other type of software. In this example, software 713 comprises signal strength module 514 and QoS module 715, although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to determine a UE QoS. In particular, signal strength module 714 directs processing system 703 to process the received signal strength metric. QoS module 715 directs process system 703 to estimate a QoS based on the selected RF coverage module, RF coverage score, application module, service module, and RF parameters.

Referring back to FIGS. 1A and 1B, UE 101 comprises Radio Frequency (RF) communication circuitry and an antenna. The RF communication circuitry typically includes an amplifier, filter, modulator, and signal processing circuitry. UE 101 may also include a user interface, memory device, software, processing circuitry, or some other communication components. UE 101 may be a telephone, computer, e-book, mobile Internet appliance, wireless network interface card, media player, game console, or some other wireless communication apparatus—including combinations thereof.

Base stations 110 and 120 comprise RF communication circuitry and an antenna. The RF communication circuitry typically includes an amplifier, filter, RF modulator, and signal processing circuitry. Base stations 110 and 120 may also comprise a router, server, memory device, software, processing circuitry, cabling, power supply, network communication interface, structural support, or some other communication apparatus. Base stations 110 and 120 could be a base station, Internet access node, telephony service node, wireless data access point, or some other wireless communication system—including combinations thereof.

Wireless communication network 130 comprises network elements that provide communications services to UE 101 through base stations 110 and/or 120. Wireless communication network 130 may comprise switches, wireless access nodes, Internet routers, network gateways, application servers, computer systems, communication links, or some other type of communication equipment—including combinations thereof.

Wireless link 131 uses the air or space as the transport media. Wireless link 131 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 133 uses metal, glass, air, space, or some other material as the transport media. Communication link 133 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 133 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to estimate a quality of service (QoS) for a user equipment (UE), the method comprising:
   processing a signal strength metric measured by the UE to select an RF coverage module;
   processing the selected RF coverage module to determine an RF coverage score for the UE that represents an amount of overlapping RF coverage and processing the RF coverage score to select an application module;
   processing the selected application module to identify a service module;
   processing the service module based on RF parameters measured by the wireless communication network to estimate the QoS for the UE; and
   transferring the estimated QoS for delivery to the UE.

2. The method of claim 1 wherein determining the RF coverage score comprises summing individual numerical values associated with each individual sector.

3. The method of claim 1 wherein the RF parameters comprise a signal strength metric measured by the wireless communication network.

4. The method of claim 1 wherein the RF parameters comprise a latency metric measured by the wireless communication network.

5. The method of claim 1 wherein the RF parameters comprise a signal to noise ratio (SNR) measured by the wireless communication network.

6. The method of claim 1 wherein the RF parameters comprise an RF noise metric measured by the wireless communication network.

7. The method of claim 1 wherein the application module comprises a video download module.

8. The method of claim 1 wherein the application module comprises a peer-to-peer voice session module.

9. The method of claim 1 wherein the application module comprises an audio download session module.

10. The method of claim 1 wherein the application module comprises a web browser module.

11. A wireless communication network to estimate a quality of service (QoS) for a user equipment (UE) comprising:
a communication interface configured to receive a signal strength metric measured by the UE, an application identifier for an application invoked on the UE, location information for the UE, and RF parameters measured by the wireless communication network;
a processing system configured to process the signal strength metric to select an RF coverage module;
the processing system configured to process the UE location information with the selected RF coverage module to determine an RF coverage score for the UE that represents an amount of overlapping RF coverage and process the RF coverage score to select an application module;
the processing system configured to process the application identifier with the selected application module to identify a service module;
the processing system configured to process the RF parameters with the service module to estimate the QoS for the UE; and
the communication interface configured to transfer the estimated QoS for delivery to the UE.

12. The wireless communication network of claim 11 wherein determining the RF coverage score comprises summing individual numerical values associated with each sector.

13. The wireless communication network of claim 11 wherein the RF parameters comprise a signal strength metric measured by the wireless communication network.

14. The wireless communication network of claim 11 wherein the RF parameters comprise a latency metric measured by the wireless communication network.

15. The wireless communication network of claim 11 wherein the RF parameters comprise a signal to noise ratio (SNR) measured by the wireless communication network.

16. The wireless communication network of claim 11 wherein the RF parameters comprise an RF noise metric measured by the wireless communication network.

17. The wireless communication network of claim 11 wherein the application module comprises a video download module.

18. The wireless communication network of claim 11 wherein the application module comprises a peer-to-peer voice session module.

19. The wireless communication network of claim 11 wherein the application module comprises an audio download session module.

20. The wireless communication network of claim 11 wherein the application module comprises a web browser module.

* * * * *